United States Patent
He et al.

(10) Patent No.: US 9,990,597 B2
(45) Date of Patent: Jun. 5, 2018

(54) SYSTEM AND METHOD FOR FORECAST DRIVEN REPLENISHMENT OF MERCHANDISE

(71) Applicant: ORACLE INTERNATIONAL CORPORATION, Redwood Shores, CA (US)

(72) Inventors: Lin He, Johns Creek, GA (US); Catalin Popescu, Atlanta, GA (US); Brent Li, Lexington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 525 days.

(21) Appl. No.: 14/671,233

(22) Filed: Mar. 27, 2015

(65) Prior Publication Data
US 2016/0283881 A1    Sep. 29, 2016

(51) Int. Cl.
*G06Q 10/00* (2012.01)
*G06Q 10/06* (2012.01)
*G06Q 10/08* (2012.01)
*G06Q 30/02* (2012.01)

(52) U.S. Cl.
CPC ..... *G06Q 10/06315* (2013.01); *G06Q 10/087* (2013.01); *G06Q 30/0202* (2013.01)

(58) Field of Classification Search
CPC .......................................... G06Q 10/00–50/00
USPC ........................................ 705/7.11–7.42, 28
See application file for complete search history.

(56) References Cited

U.S. PATENT DOCUMENTS

| | | | | |
|---|---|---|---|---|
| 5,765,143 A | * | 6/1998 | Sheldon ............... | G06Q 10/087 705/22 |
| 5,893,076 A | * | 4/1999 | Hafner ................. | G06Q 10/087 705/28 |
| 5,897,624 A | * | 4/1999 | Ramaswamy ..... | G06Q 10/0875 705/28 |
| 5,963,919 A | * | 10/1999 | Brinkley .............. | G06Q 10/087 705/22 |

(Continued)

FOREIGN PATENT DOCUMENTS

WO    WO 03054756    *    3/2003    ............. G06F 17/60

OTHER PUBLICATIONS

Harrison, P. J., and Owen L. Davies. "The use of cumulative sum (CUSUM) techniques for the control of routine forecasts of product demand." Operations Research 12.2 (1964): 325-333.*

(Continued)

*Primary Examiner* — Alan S Miller
(74) *Attorney, Agent, or Firm* — Cooper Legal Group, LLC (57) ABSTRACT

Systems, methods, and other embodiments are disclosed that are configured to generate replenishment parameters for use by an external replenishment system. In one embodiment, sales statistics are generated for an item based at least in part on historical sales data for the item. A determination is made as to if demand forecast data is available for the item. If demand forecast data is not available, an order-point value for the item is generated based at least in part on the sales statistics. If demand forecast data is available, demand forecast statistics are generated and the order-point value is generated based at least in part on the sales statistics and the demand forecast statistics. An order-up-to-level is generated based at least in part on the order-point value.

21 Claims, 3 Drawing Sheets

(56) References Cited

U.S. PATENT DOCUMENTS

| | | | | |
|---|---|---|---|---|
| 6,006,202 A * | 12/1999 | Ramaswamy | G06Q 10/08 | 705/28 |
| 6,061,691 A * | 5/2000 | Fox | G06Q 10/087 | |
| 6,144,945 A * | 11/2000 | Garg | G06Q 10/087 | 705/28 |
| 6,609,101 B1 * | 8/2003 | Landvater | G06Q 10/06 | 705/7.25 |
| 6,611,726 B1 * | 8/2003 | Crosswhite | G06F 17/18 | 700/100 |
| 6,970,841 B1 * | 11/2005 | Cheng | G06Q 10/0631 | 705/22 |
| 6,996,538 B2 * | 2/2006 | Lucas | G06Q 10/06 | 705/26.41 |
| 7,881,987 B1 * | 2/2011 | Hart | G06Q 10/087 | 705/26.8 |
| 7,896,244 B2 * | 3/2011 | McCormick | G06Q 10/087 | 235/375 |
| 8,036,957 B2 * | 10/2011 | Ettl | G06Q 10/087 | 705/22 |
| 8,103,539 B2 * | 1/2012 | Boardman | G06Q 10/06 | 705/7.29 |
| 8,165,914 B2 * | 4/2012 | Bachman | G06Q 10/063 | 705/28 |
| 8,190,488 B2 * | 5/2012 | Rai | G06Q 10/06 | 705/22 |
| 8,706,536 B1 * | 4/2014 | McPhetrige | G06Q 10/087 | 705/7.11 |
| 2002/0198794 A1 * | 12/2002 | Williams | G06Q 10/06 | 705/28 |
| 2004/0230473 A1 * | 11/2004 | Dogan | G06Q 10/06 | 705/7.25 |
| 2006/0026072 A1 * | 2/2006 | Suguro | G06Q 10/087 | 705/300 |
| 2006/0047559 A1 * | 3/2006 | Jacoby | G06Q 10/06315 | 705/28 |
| 2007/0083413 A1 * | 4/2007 | Srinivasan | G06Q 10/063 | 705/7.12 |
| 2008/0133310 A1 * | 6/2008 | Kim | G06O 30/02 | 705/7.31 |
| 2008/0147477 A1 * | 6/2008 | McCormick | G06Q 20/203 | 235/385 |
| 2008/0172280 A1 * | 7/2008 | Goulimis | G06Q 10/06 | 705/7.25 |
| 2009/0125385 A1 * | 5/2009 | Landvater | G06Q 10/06315 | 705/7.31 |
| 2009/0327103 A1 * | 12/2009 | Handley | G06Q 10/087 | 705/28 |
| 2010/0312611 A1 * | 12/2010 | Henderson | G06Q 10/0637 | 705/7.36 |
| 2011/0077991 A1 * | 3/2011 | Dance | G06Q 30/0202 | 705/7.35 |
| 2014/0156348 A1 * | 6/2014 | Sinkel | G06Q 30/0605 | 705/7.31 |

OTHER PUBLICATIONS

Schneider, Helmut. "Methods for determining the re-order point of an (s, S) ordering policy when a service level is specified." Journal of the Operational Research Society (1978): 1181-1193.*

Oravec, R. J. "Statistical inventory management." Journal of Accountancy (pre-1986) 110.000006 (1960): 40.*

Gupta, Mahesh, and Amarpreet Kohli. "Enterprise resource planning systems and its implications for operations function." Technovation 26.5-6 (2006): 687-696.*

* cited by examiner

SYSTEM AND METHOD FOR FORECAST DRIVEN REPLENISHMENT OF MERCHANDISE

BACKGROUND

A retail business needs to manage its supply chain of products. In one aspect, computer applications are used to manage inventory of products and determine demand forecasts. In the retail industry, a replenishment process is followed to decide how much product to order and when to order product to ensure that there is enough inventory in store to satisfy customer demand.

Normally, the current inventory level for a product or item is compared against some defined threshold level of inventory. If the current level of the inventory is less than the threshold level, an order will be placed. The level to which the inventory is to be increased by placing an order may be defined as well. The amount of product to be ordered (the order quantity) is simply the difference between the level to which the inventory is to be increased and the threshold level of inventory.

Defining values for the threshold level and the level to which the inventory is to be increased is too often an unreliable and inaccurate guessing game. Many times, the values are simply set to some fixed values which are used over and over again for each replenishment cycle. The fixed values may work well enough for some replenishment cycles, but may not work well at all for others. Good values should result in minimizing on-hand inventory while also preventing out of stock situations.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments are disclosed for generating values of replenishment parameters for use by an inventory replenishment system. Example embodiments are discussed herein with respect to computerized retail inventory management, where sales histories and demand forecasts of retail items are taken into consideration.

In one embodiment, a replenishment parameter tool is disclosed that is configured to take into account whether or not demand forecast data for an item is available along with historical sales data for the item, before generating replenishment parameters. When demand forecast data for an item is not available, replenishment parameters are generated based at least in part on the historical sales data. When demand forecast data for an item is available, replenishment parameters are generated based at least in part on the historical sales data and the demand forecast data. The present systems and methods improve a computer system to more accurately manage inventories of retail items to reduce inventory costs and reduce lost sales.

The following terms are used herein with respect to various embodiments.

The term "item" or "retail item", as used herein, refers to merchandise sold, purchased, and/or returned in a sales environment.

The terms "period", "time period", "retail period", or "calendar period", as used herein, refer to a unit increment of time (e.g., a 7-day week) which sellers use to correlate seasonal periods from one year to the next in a calendar for the purposes of planning and forecasting. The terms may be used interchangeably herein.

The term "location" or "retail location", as used herein, may refer to a physical store where an item is sold, or to an on-line store via which an item is sold.

The term "historical sales data", as used herein, refers to sales information that has been recorded for an item that has been sold in past retail periods (e.g., over 52 weeks of the past year). Historical sales data may include, for example, a number of units of an item sold in each retail period. Historical sales data may be stored in a database device, for example.

The term "demand forecast data", as used herein, refers to estimated expected future sales for an item to be sold in future retail periods (e.g., over 52 weeks of the next year). Demand forecast data may include, for example, a number of units of an item expected to be sold in each future retail period. Demand forecast data may be generated by a demand forecast model and stored in a database device, for example.

The term "order-point value" (or "order_point" value), as used herein, refers to an inventory level of an item at which an order for additional units of the item is to be placed.

The term "order-up-to-level" (or "order_up_to_level"), as used herein, refers to a level to which the inventory of an item is to be increased by placing an order.

The terms "min-value" (or "min_value"), "max-value" (or "max_value"), "min-supply value" (or "min_supply value"), "max-supply value" (or "max_supply value"), and "time-supply-horizon value" (or "time_supply_horizon value"), as used herein, are parameter inputs to a replenishment system for facilitating the replenishment of inventories of items.

The term "statistics", as used herein, refers to one or more numerical facts or data computed from other data which characterize the other data in some manner. For example, statistics may include a mean value of a numerical data set, a standard deviation value of a numerical data set, or both a mean value and a standard deviation value of a numerical data set.

Figure 1:
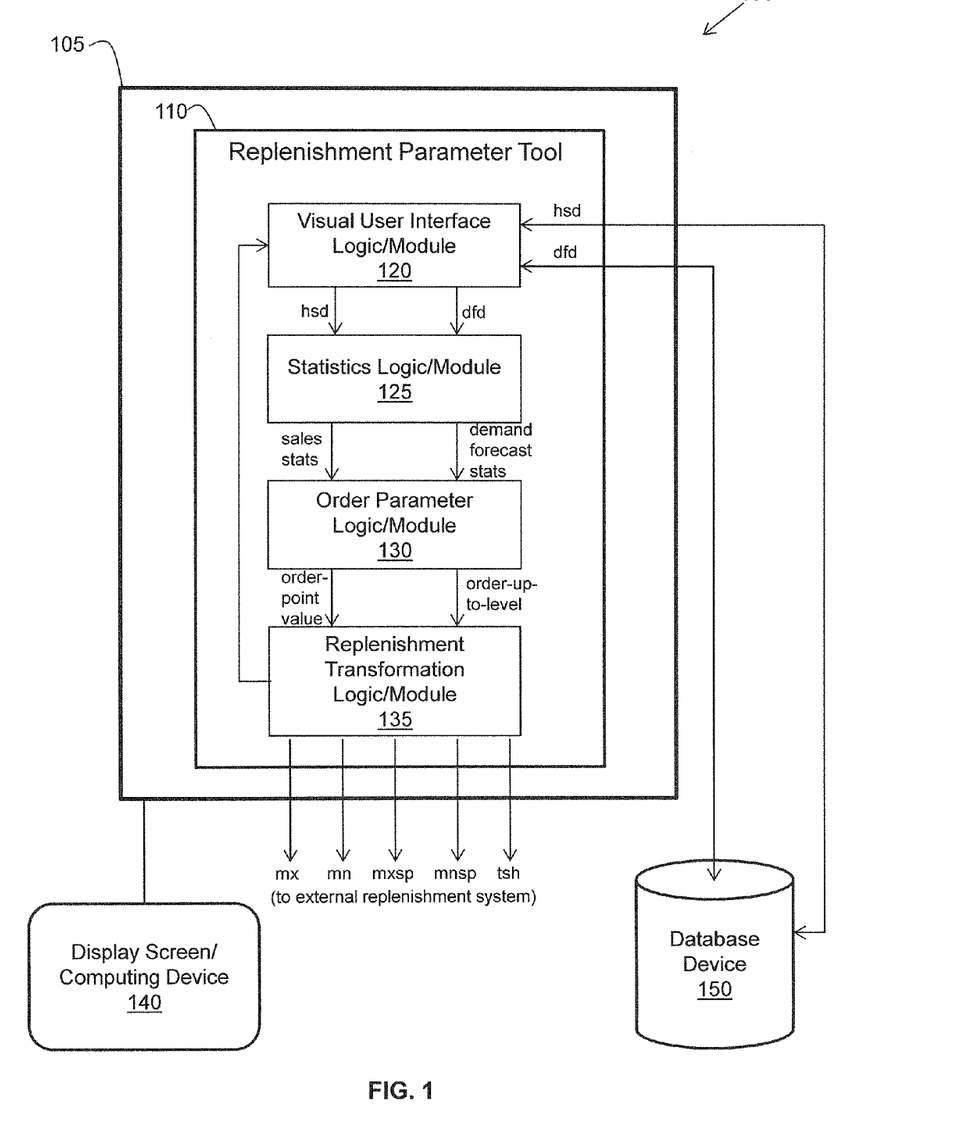
FIG. 1 illustrates one embodiment of a computer system, having a computing device configured with a replenishment parameter tool.

FIG. 1 illustrates one embodiment of a computer system 100, having a computing device 105 configured with a replenishment parameter tool 110. For example, in one embodiment, the replenishment parameter tool 110 may be part of a larger computer application, configured to forecast and manage sales, promotions, and inventory for retail items at various retail locations. The replenishment parameter tool 110 is configured to computerize the process for analyzing sales and forecast data to generate replenishment parameter values for an external replenishment system. In one embodiment, the software and computing device 105 may be configured to operate with or be implemented as a cloud-based networking system, a software-as-a-service (SaaS) architecture, or other type of computing solution.

Many retailers desire to use forecast driven replenishment methods. However, a forecast driven replenishment method may work well only when the forecast accuracy is high. For items with less accurate forecasts, calculations of replenishment parameter values may not be very useful. A replenishment parameter method is disclosed herein that outperforms other methods for items with low forecast accuracy. The method may use forecast data as well as historical data to generate replenishment parameter values (e.g., order-point values and order-up-to-levels). However, if no forecast is available, historical data may be used to estimate demand in a replenishment window.

Therefore, the embodiments described herein may be used for all items regardless of forecast availability. However, forecast information is used when the forecast information is readily available. Replenishment parameter values may be generated using both historical data and forecast data. However, in a situation where the forecast data is unreliable, good results may still be obtained.

In one embodiment, a computer algorithm is disclosed that implements an analytical approach to determining an order-point value and an order-up-to-level for an item. It is assumed herein that historical sales data is available for use and demand forecast data may or may not be available for use. For example, demand forecast data may be generated by a demand forecast model and stored in a database device which may be accessed by the present system. Therefore, the demand forecast data is available to the present system. However, demand forecast data for an item may not exist, may exist but cannot be found, or may exist but permission to access the data has been denied. Therefore, the demand forecast data is not available to the present system.

In accordance with one embodiment, historical sales data and demand forecast data (when available) are analyzed to generate the inventory replenishment parameters of order-point value and order-up-to-level for an item. Statistics of the historical sales data and the demand forecast data (when available) may be computed and used, along with other information, to generate the order-point value and the order-up-to-level for the item. The order-point value and the order-up-to-level may be modified to be compatible with, for example, a min/max replenishment system or a time-supply replenishment system.

Such an analytical approach allows a seller (e.g., a retailer) to gain insight into an inventory of an item and enables the retailer to more effectively manage the inventory. A seller can realize significant revenue and/or profit increase by having the right inventory levels. In the following, a computer-implemented methodology to estimate inventory replenishment parameters for an item is presented. In one embodiment, a replenishment parameter tool is configured to perform the methodology.

With reference to FIG. 1, in one embodiment, the replenishment parameter tool 110 is implemented on the computing device 105 and includes logics for implementing various functional aspects of the replenishment parameter tool 110. In one embodiment, the replenishment parameter tool 110 includes visual user interface logic 120, statistics logic 125, order parameter logic 130, and replenishment transformation logic 135.

The computer system 100 also includes a display screen 140 operably connected to the computing device 105. In accordance with one embodiment, the display screen 140 is implemented to display views of and facilitate user interaction with a graphical user interface (GUI) generated by the visual user interface logic 120 for viewing and updating information associated with replenishment parameters. The graphical user interface may be associated with a replenishment parameter application and the visual user interface logic 120 may be configured to generate the graphical user interface. In one embodiment, the replenishment parameter tool 110 is a centralized server-side application that is accessed by many client devices/users. Thus the display screen 140 may represent multiple computing devices/terminals that allow users to access and receive services from the replenishment parameter tool 110 via networked computer communications.

In one embodiment, the computer system 100 further includes at least one database device 150 operably connected to the computing device 105 and/or a network interface to access the database device 150 via a network connection. For example, in one embodiment, the database device 150 is operably connected to the visual user interface logic 120. In accordance with one embodiment, the database device 150 is configured to store and manage data structures (e.g., records of historical sales data and demand forecast data for items) associated with the replenishment parameter tool 110 in a database system (e.g., a computerized inventory management and demand forecasting application).

Other embodiments may provide different logics or combinations of logics that provide the same or similar functionality as the replenishment parameter tool 110 of FIG. 1. In one embodiment, the replenishment parameter tool 110 is an executable application including algorithms and/or program modules configured to perform the functions of the logics. The application is stored in a non-transitory computer storage medium. That is, in one embodiment, the logics of the tool 110 are implemented as modules of instructions stored on a computer-readable medium.

Referring back to the logics of the replenishment parameter tool 110 of FIG. 1, in one embodiment, the visual user interface logic 120 is configured to generate a graphical user interface (GUI) to facilitate user interaction with the replenishment parameter tool 110. For example, the visual user interface logic 120 includes program code that generates and causes the graphical user interface to be displayed based on an implemented graphical design of the interface. In response to user actions and selections via the GUI, associated aspects of replenishment parameter generation for retail items may be manipulated.

For example, in one embodiment, the visual user interface logic 120 is configured to facilitate receiving inputs and reading data in response to user actions. For example, the visual user interface logic 120 may facilitate selection and reading of historical sales data and demand forecast data associated with retail items sold at a retail location. The historical sales data and the demand forecast data may reside in at least one data structure (e.g., within database device 150) associated with (and accessible by) a replenishment parameter application (e.g., the replenishment parameter tool 110) via the graphical user interface. The generation of replenishment parameters may be based at least in part on the historical sales data and the demand forecast data.

Historical sales data may include, for example, data representing past sales of an item across a plurality of past retail periods. The historical sales data may be segmented into retail periods of past weeks, with each past week having numerical values assigned to it to indicate the number of items sold for that week, in accordance with one embodiment. The demand forecast data may include, for example, data representing predicted or expected future sales of an item across a plurality of future retail periods. The demand forecast data may be segmented into retail periods of future weeks, with each future week having numerical values assigned to it to indicate the expected number of items to be sold for that week, in accordance with one embodiment. The historical sales data and the demand forecast data (when available) for an item may be accessed via network communications.

Furthermore, the visual user interface logic 120 is configured to facilitate the outputting and displaying of replenishment parameter values, via the graphical user interface, on the display screen 140. Replenishment parameter values may include, for example, an order-point value and an order-up-to-level. An order-point value represents an inventory level of an item at which an order for additional units of the item is to be placed. An order-up-to-level represents a level to which an inventory for an item is to be increased. In one embodiment, replenishment transformation logic 135 is configured to operably interact with the visual user interface logic 120 to facilitate displaying of replenishment parameter values of an output data structure.

Other replenishment parameter values may be derived from an order-point value and an order-up-to-level. Two such other replenishment parameter values are a min-value and a max-value. An order-point value may be represented and output as a min-value and an order-up-to-level may be represented and output as a max-value. Such a min-value and max-value are compatible with a min/max replenishment system, in accordance with one embodiment. Three such other replenishment parameter values are a min-supply value, a max-supply value, and a time-supply-horizon value which are derived from an order-point value and an order-up-to-level. Such a min-supply value, max-supply value, and time-supply-horizon value are compatible with a time-supply replenishment system, in accordance with one embodiment.

Referring again to FIG. 1, in one embodiment, the statistics logic 125 is configured to generate sales statistics for an item based at least in part on historical sales data (hsd) for the item. Furthermore, the statistics logic 125 is configured to generate demand forecast statistics for the item, based at least in part on demand forecast data (dfd) for the item, when the demand forecast data for the item is available.

In accordance with one embodiment, the visual user interface logic 120 receives the historical sales data and the demand forecast data from the database device 150 and provides the historical sales data and the demand forecast data to the statistics logic 125. Furthermore, in accordance with one embodiment, the visual user interface logic 120 is configured to determine that demand forecast data for an item is or is not available to the computer system 100. For example, if a user cannot find the demand forecast data via the graphical user interface provided by the visual user interface logic 120, a flag may be set within the visual user interface logic 120 indicating that the demand forecast data is not available. Such a flag may be provided to the statistics logic 125, for example.

The statistics may include, for example, mean values and standard deviation values. For example, sales statistics may include a mean value and a standard deviation value of the historical demand data that is generated by the statistics logic 125. The mean value and the standard deviation value are the mean and standard deviation of numbers of units of the item sold over a plurality of past time periods.

Similarly, demand forecast statistics may include a mean value and a standard deviation value of the demand forecast data that is generated by the statistics logic 125. The mean value and the standard deviation value are the mean and standard deviation of numbers of units of an item forecast to be sold over a plurality of future time periods. Other types of statistics, besides means and standard deviations, are possible as well, in accordance with other embodiments.

In one embodiment, the order parameter logic 130 is configured to receive sales statistics from the statistics logic 125. The order parameter logic 130 is also configured to receive demand forecast statistics (when the demand forecast data is available) from the statistics logic 125. The order parameter logic 130 is further configured to generate an order-point value, based at least in part on the sales statistics and the demand forecast statistics, when the demand forecast statistics for an item is available to the computer system 100.

The order parameter logic 130 is also configured to generate an order-point value, based at least in part on the sales statistics, when the demand forecast data for the item is not available to the computer system 100. For example, the demand forecast data for an item may not be available to the computer system 100 because the demand forecast data for the item may not exist, may exist but cannot be found, or may exist but permission to access the data has been denied. Again, the order-point value represents an inventory level of the item at which an order for additional units of the item is to be placed.

Whether or not demand forecast data is available, in accordance with one embodiment, other data that may be used in the generation of the order-point value may include a lead time (LT) for the item, a review time (RT) for the item, and a safety stock factor (SSF) for the item. A lead time (LT) for an item is the time it takes (e.g., number of days) for an item to get from the warehouse to the retail location (e.g., store). A review time (RT) for an item is an interval of time (e.g., number of days or weeks) between orders for the item. A safety stock factor (SSF) for an item is an extra number of units of the item that are ordered to account for variability in demand for the item.

The order parameter logic 130 is also configured to generate an order-up-to-level for an item, based at least in part on the order-point value, whether or not the demand forecast data is available to the computer system 100. Again, the order-up-to-level represents a level to which the inventory of the item is to be increased. Whether or not demand forecast data is available, in accordance with one embodiment, other data that may be used in the generation of the order-point value may include a days-of-supply (DOS) value and a mean value of the demand forecast statistics. A DOS value for an item represents a remaining time of supply (e.g., number of days) of the item in a current inventory of the item. For example, if the DOS value is four (4) days, then the number of units of the item in the inventory is predicted to go to zero (0) units over the next four (4) days unless additional units of the item are acquired and placed in the inventory before then.

In accordance with one embodiment, an order quantity is equal to the order-up-to-level less the order-point value (or the current inventory level of the item), where the order quantity is the number of units of the item to be ordered. The order quantity is determined by an external replenishment system, in accordance with one embodiment, when the order-point value and the order-up-to-level (or some compatible modification of the order-point value and the order-up-to-level) are sent to the replenishment system from the replenishment parameter tool 110.

In one embodiment, the replenishment transformation logic 135 is configured to receive the order-point value and the order-up-to-level from the order parameter logic 130. When demand forecast data for an item is not available to the computer system 100, the replenishment transformation logic 135 is configured to transform the order-point value into a min-value that is compatible with a min/max replenishment system.

Also, when demand forecast data for an item is not available to the computer system 100, the replenishment transformation logic 135 is configured to transform the order-up-to-level into a max-value that is compatible with the min/max replenishment system. The replenishment transformation logic 135 is also configured to send the max-value and the min-value to the min/max replenishment system. In accordance with one embodiment, the min/max replenishment system is external to the computer system 100.

However, when demand forecast data for an item is available to the computer system 100, the replenishment transformation logic 135 is configured to generate a min-supply value, a max-supply value, and a time-supply-horizon value, based at least in part on the order-point value and the order-up-to-level. In one embodiment, the min-supply value, the max-supply value, and the time-supply-horizon value are compatible with a time-supply replenishment system. The replenishment transformation logic 135 is also configured to send the min-supply value, the max-supply value, and the time-supply-horizon value to the time-supply replenishment system. In accordance with one embodiment, the time-supply replenishment system is external to the computer system 100.

In accordance with another embodiment, an external replenishment system may be configured to receive any of the max-value and the min-value or the min-supply value, the max-supply value, and the time-supply-horizon value, and act as either a min/max replenishment system or a time-supply replenishment system.

In accordance with one embodiment, the demand replenishment transformation logic 135 is configured to transform an output data structure (e.g., associated with the replenishment parameter tool 110) by populating the output data structure with the replenishment parameter values for an item. Furthermore, in one embodiment, the replenishment transformation logic 135 is configured to operably interact with the visual user interface logic 120 to facilitate displaying, on the display screen 140, the replenishment parameter values in the output data structure via the graphical user interface.

In this manner, a replenishment parameter tool 110 (e.g., implemented as part of a larger computer application) can accurately determine an order-point value and an order-up-to-level for a retail item. As a result, using such a replenishment parameter tool 110, a retailer may more accurately determine a quantity of the retail item to order.

Figure 2:
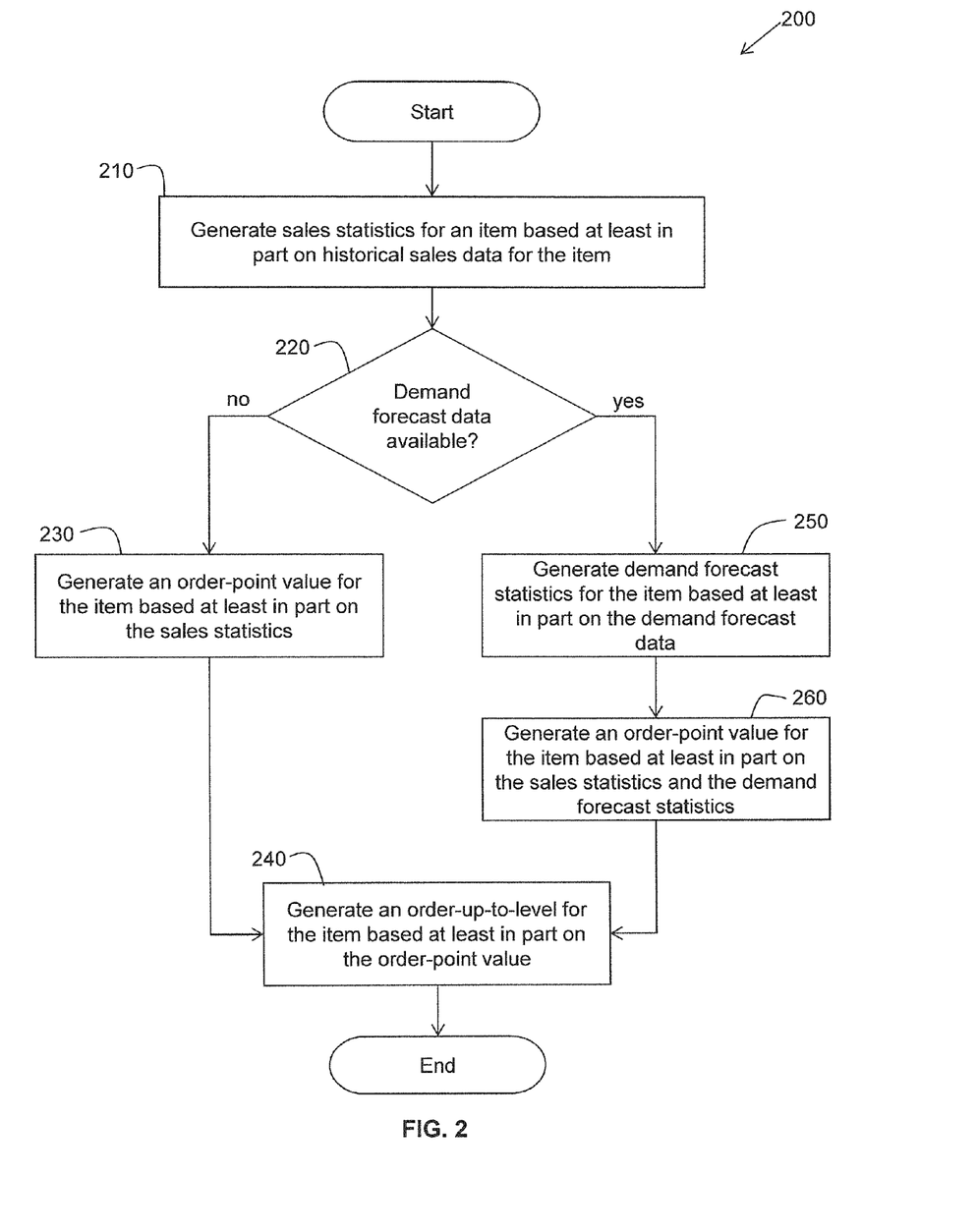
FIG. 2 illustrates one embodiment of a method, which can be performed by the replenishment parameter tool of the computer system of FIG. 1, for generating replenishment parameters which can be used by an external replenishment system.

FIG. 2 illustrates one embodiment of a computer-implemented method 200 for generating replenishment parameters which can be used by an external replenishment system. Method 200 describes operations of the replenishment parameter tool 110 and is implemented to be performed by the replenishment parameter tool 110 of FIG. 1, or by a computing device configured with an algorithm of the method 200. For example, in one embodiment, method 200 is implemented by a computing device configured to execute a computer application. The computer application is configured to process data in electronic form and includes stored executable instructions that perform the functions of method 200.

Method 200 will be described from the perspective that, for an item (e.g., a retail item) sold at a location (e.g., a retail location), the inventory of the item is periodically reviewed and orders are periodically placed to replenish the inventory of the item. Also, a retail calendar has many retail periods (e.g., weeks) that are organized in a particular manner (e.g., four (4) thirteen (13) week quarters) over a typical calendar year. A retail period may occur in the past or in the future. Historical sales data may include, for example, a number of units of an item sold in each of a plurality of past retail periods. Demand forecast data may include, for example, a number of units of an item expected to be sold in each of a plurality of future retail periods.

Historical sales data includes sales information that has been recorded for an item that has been sold in past retail periods (e.g., over 52 weeks of the past year). Historical sales data may be stored in a database device, for example. Demand forecast data includes estimated or expected future sales for an item to be sold in future retail periods (e.g., over 52 weeks of the next year). Demand forecast data may be generated by a demand forecast model and stored in a database device, for example. In accordance with one embodiment, the replenishment parameter tool 110 is configured to read historical sales data and demand forecast data for an item from at least one data structure (e.g., from data structures in the database 150).

Upon initiating method 200, at block 210, sales statistics for an item are generated based at least in part on historical sales data for the item. In one embodiment, the sales statistics are generated by the statistics logic 125. The sales statistics may include at least one of a mean value and a standard deviation value of numbers of units of the item sold over a plurality of past time periods. For example, the mean value may be an average of weekly sales represented as the term "wk_mean_sales". The standard deviation value may be the variability of the weekly sales represented as the term "wk_std_sales". Other types of statistics, besides means and standard deviations, are possible as well, in accordance with other embodiments.

At block 220, a determination is made as to if demand forecast data for the item is available to the computer system performing method 200. For example, in one embodiment, a user may employ the graphical user interface generated by the visual user interface logic 120 to search for demand forecast data for the item in the database device 150. The demand forecast data for the item may be found and read into the replenishment parameter tool 110 (i.e., the demand forecast data is determined to be available). Alternately, the demand forecast data for the item may not exist, may exist but cannot be found, or may exist but permission to access the data is denied (i.e., the demand forecast data is not available).

In one embodiment, the visual user interface logic 120 is configured to make the determination of whether or not demand forecast data for an item is available. In another embodiment, the statistics logic 125 is configured to make the determination (e.g., based simply on not finding any read-in demand forecast data in a data structure designated for such demand forecast data). If demand forecast data is determined to not be available to the replenishment parameter tool 110, the method proceeds to block 230. If demand forecast data is determined to be available to the replenishment parameter tool 110, the method proceeds to block 250.

At block 230, when demand forecast data for the item is not available, an order-point value (order_point value) for the item is generated based at least in part on the sales statistics. The order-point value represents an inventory level of the item at which an order for additional units of the item is to be placed. For example, if the order-point value for the item is 25 units then, when the inventory level drops to or below 25 units (e.g., due to recent sales of the item), it is time for an order for additional units of the item to be placed.

In one embodiment, generation of the order-point value is based on the sales statistics (wk_mean_sales and wk_std_sales) as well as a lead time (LT) for the item, a review time (RT) for the item, and a safety stock factor (SSF) for the item. For example, the order-point value for the item may be generated in accordance with an algorithm where at least a portion of the algorithm is represented by the following expression:

$$\text{order\_point value} = \left(\text{wk\_mean\_sales} \times \frac{(LT+RT)}{7}\right) + \left(SSF \times \text{wk\_std\_sales} \times \sqrt{\frac{LT}{7}}\right)$$

The value of seven (7), used in the various expressions herein, is used simply to express the weekly terms in units of "days" (i.e., there are seven days in a week). A lead time (LT) for an item is the time it takes (e.g., number of days) for an item to get from the warehouse to the retail location (e.g., store). A review time (RT) for an item is an interval of time (e.g., number of days or weeks) between orders for the item. A safety stock factor (SSF) for an item is an extra number of units of the item that are ordered to account for variability in demand for the item. In accordance with one embodiment, the order-point value is generated by the order parameter logic 130 of the tool 110.

At block 240, when demand forecast data for the item is not available, an order-up-to-level (order_up_to_level) for the item is generated based at least in part on the order-point value. The order-up-to-level represents a level to which the inventory of the item is to be increased. For example, the order-point value for the item may be 25 units, as given in the example above herein, and the order-up-to-level may be 60 units. As such, the order quantity (i.e., the number of units to order when the order-point value of 25 is reached) is the order-up-to-level less the order-point value (i.e., order quantity=50 units−25 units=35 units).

In one embodiment, generation of the order-up-to-level is based on the order-point value, the wk_mean_sales of the sales statistics, and a days-of-supply (DOS) value for the item.

For example, the order-up-to-level for the item may be generated in accordance with an algorithm where at least a portion of the algorithm is represented by the following expression:

$$\text{order\_up\_to\_level} = \text{order\_point value} + \left(DOS \times \frac{\text{wk\_mean\_sales}}{7}\right)$$

A DOS value for an item represents a remaining time of supply (e.g., number of days) of the item in a current inventory of the item. For example, if the DOS value is four (4) days, then the number of units of the item in the inventory is predicted to go to zero (0) over the next four (4) days unless additional units of the item are acquired and placed in the inventory before then. In accordance with one embodiment, the order-up-to-level is generated by the order parameter logic 130 when demand forecast data for the item is not available.

At block 250, when demand forecast data for the item is available (e.g., as generated by a demand forecast model), demand forecast statistics for the item are generated based at least in part on the demand forecast data. In one embodiment, the demand forecast statistics are generated by the statistics logic 125. The demand forecast statistics may include at least one of a mean value and a standard deviation value of numbers of units of an item forecast to be sold over a plurality of future time periods. Other types of statistics, besides means and standard deviations, are possible as well, in accordance with other embodiments.

For example, when demand forecast data is available, a window length (window_length) may be generated using lead time (LT), review time (RT), days-of-supply (DOS), and window factor (WF). The window factor (WF) is a multiplying factor that accounts for uncertainty in the lead time (LT) and the review time (RT). For example, the window_length may be generated in accordance with an algorithm where at least a portion of the algorithm is represented by the following expression:

$$\text{window\_length} = \text{roundup}(WF \times (LT+RT+DOS))$$

The window_length represents, for example, a number of days over which demand forecast data for the item are to be considered when generating demand forecast statistics for the item. For example, the window_length may cover a period from (today) to (today+window_length−1). The "roundup" function simply means rounding up the value of the expression to the nearest integer value.

Demand forecast data is often available in weekly form (i.e., over retail periods of individual weeks). In one embodiment, demand forecast statistics of a daily forecast may be generated by spreading weekly forecast data using a daily profile. As such, demand forecast statistics may include a daily forecast average (day_mean_frcst) and a daily forecast standard deviation (day_std_frcst) that are generated over the window_length.

A forecast of demand for an item may be accurate or may not be so accurate. To account for the quality of a forecast, a daily demand variation or a standard deviation of daily demand (day_std_dmd) may be estimated based on the sales history and the forecast. For example, the day_std_dmd may be generated in accordance with an algorithm where at least a portion of the algorithm is represented by the following expression:

$$\text{day\_std\_dmd} = \max\left(\text{day\_std\_frcst}, \min\left(\frac{\text{day\_mean\_frcst} \times 7}{\text{wk\_mean\_frcst}}, 1\right) \times \frac{\text{wk\_std\_sales}}{\sqrt{7}}\right)$$

Again, in accordance with one embodiment, the demand forecast statistics are generated by the statistics logic 125. The standard deviation of daily demand (day_std_dmd) may then be used to generate an order-point value for the item when demand forecast data is available.

At block 260, when demand forecast data for the item is available, an order-point value for the item is generated based at least in part on the sales statistics and the demand forecast statistics. In one embodiment, generation of the order-point value is based on the daily forecast average (day_mean_frcst) for the item, the standard deviation of daily demand (day_std_dmd) for the item, as well as a lead time (LT) for the item, a review time (RT) for the item, and a safety stock factor (SSF) for the item.

For example, the order-point value for the item may be generated in accordance with an algorithm where at least a portion of the algorithm is represented by the following expression:

order_point value=(day_mean_frcst×(LT+RT))+ (SSF×day_std_dmd×√LT)

where LT, RT, and SSF are as previously defined herein. Again, In accordance with one embodiment, the order-point value is generated by the order parameter logic 130 of the tool 110.

At block 240, when demand forecast data for the item is available, an order-up-to-level for the item is generated based at least in part on the order-point value. In one embodiment, generation of the order-up-to-level is based on the order-point value, the day_mean_frcst of the demand forecast statistics, and the days-of-supply (DOS) value for the item. In accordance with one embodiment, the order-up-to-level is generated by the order parameter logic 130 when demand forecast data for an item is available.

For example, the order-up-to-level for the item may be generated in accordance with an algorithm where at least a portion of the algorithm is represented by the following expression:

order_up_to_level=order_point value+(DOS× day_mean_frcst)

In this manner, when historical sales data is available for an item, an order-point value and an order-up-to-level may be generated for the item, whether or not demand forecast data is available for an item. Method 200 not only takes into consideration whether or not demand forecast data for an item is available to the computer system 100, method 200 also takes into consideration whether or not the demand forecast data (when available) is accurate. As a result, method 200 attempts to generate both an accurate order-point value and an accurate order-up-to-level based on the circumstances.

In accordance with one embodiment, for an item without a demand forecast, an order-point value and an order-up-to-level for an item may be represented as a min-value (min_value or mn) and a max-value (max_value or mx), respectively. The min-value and the max-value are compatible with and may be sent to a min/max replenishment system, in accordance with one embodiment. Such representation and sending may be accomplished by the replenishment transformation logic 135 of the replenishment parameter tool 110, in accordance with one embodiment.

The min/max replenishment system may be configured to operate on the min-value and the max-value to generate an order quantity for the item and place an order for the item. For example, if the current inventory level is less than the min_value, then an order quantity for the item may be generated in accordance with the following expression:

order quantity=max_value−current_inventory_level.

In accordance with another embodiment, for an item with a demand forecast, an order-point value and an order-up-to-level for the item may be operated upon by the replenishment transformation logic 135 of the replenishment parameter tool 110. As a result, the replenishment transformation logic 135 may generate a min-supply value, a max-supply value, and a time-supply-horizon value. The min-supply value, the max-supply value, and the time-supply-horizon value are compatible with and may be sent to a time-supply replenishment system, in accordance with one embodiment. The time-supply replenishment system may be configured to operate on the min-supply value, the max-supply value, and the time-supply-horizon value to generate an order quantity for the item and place an order for the item.

For example, the min-supply value (min_supply value or mnsp) for the item may be generated in accordance with an algorithm where at least a portion of the algorithm is represented by the following expression:

$$\text{min\_supply value} = LT + RT + \left(\frac{SSF \times \text{day\_std\_dmd} \times \sqrt{LT}}{\text{day\_mean\_frcst}}\right)$$

which is equivalent to the order-point value normalized to the day_mean_frcst.

The max-supply value (max_supply value or mxsp) for the item may be generated in accordance with an algorithm where at least a portion of the algorithm is represented by the following expression:

max_supply value=min_supply value+DOS which is equivalent to the order-up-to-level normalized to the day_mean_frcst.

The time-supply-horizon value (time_supply_horizon value or tsh) for the item may be generated in accordance with an algorithm where at least a portion of the algorithm is represented by the following expression:

time_supply_horizon value=roundup(WF×max_supply value)

A time-supply replenishment system may be configured to generate an order quantity for an item based on a function, f, of min-supply value, max-supply value, and time-supply-horizon value as follows:

order quantity=f(min_supply value,max_supply value,time_supply_horizon value)

In this manner, a replenishment system can use this information to adjust order quantities to improve sales and reduce inventory costs. A reduction in inventory cost of as little as 1% can amount to millions of dollars in savings per year for some retailers. Furthermore, a retailer can more accurately manage inventory of merchandise by accounting for the absence of a demand forecast or an inaccurate demand forecast for the merchandise.

Systems, methods, and other embodiments have been described, for generating replenishment parameters for use by an external replenishment system. In one embodiment, a system and method are associated with a computer application configured to execute on a computing device. In one embodiment, sales statistics are generated for an item based at least in part on historical sales data for the item. A determination is made as to if demand forecast data is available for the item. If demand forecast data is not available, an order-point value for the item is generated based at least in part on the sales statistics. If demand forecast data is available, demand forecast statistics are generated and the order-point value is generated based at least in part on the sales statistics and the demand forecast statistics. The order-point value represents an inventory level of the item at which an order for additional units of the item is to be placed. An order-up-to-level is generated based at least in part on the order-point value. The order-up-to-level represents a level to which the inventory of the item is to be increased. The order-point value and the order-up-to-level may be modified into replenishment parameters that are compatible with an external replenishment system.

Computing Device Embodiment

Figure 3:
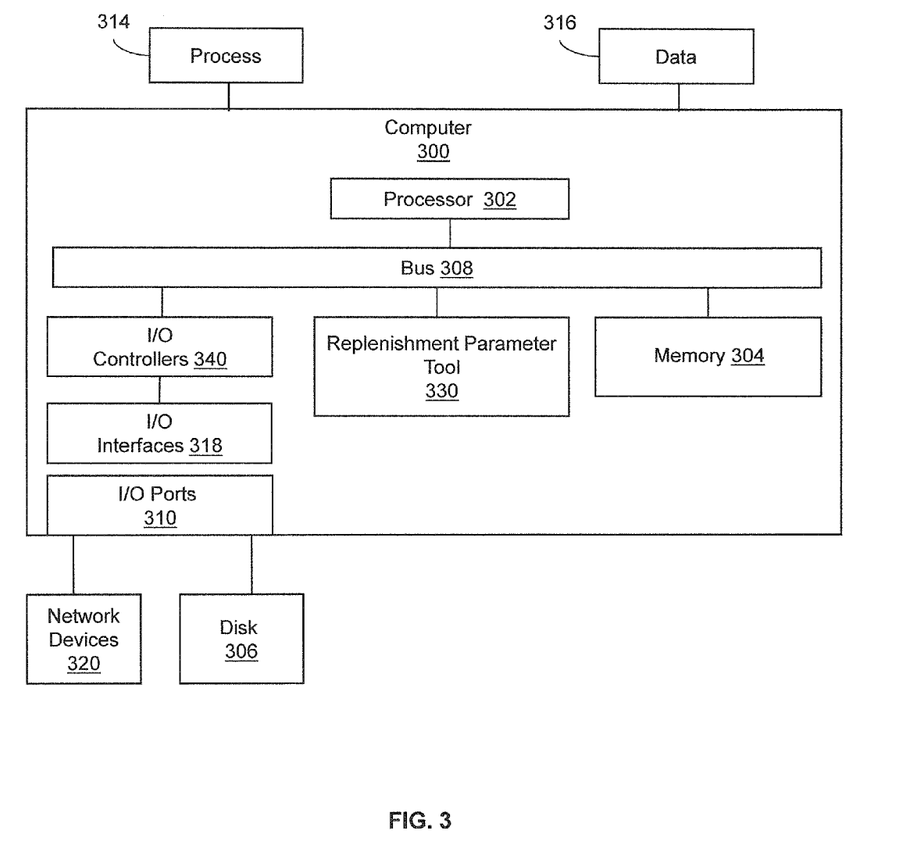
FIG. 3 illustrates one embodiment of a computing device upon which a replenishment parameter tool of a computing system may be implemented.

FIG. 3 illustrates an example computing device that is configured and/or programmed with one or more of the example systems and methods described herein, and/or equivalents. FIG. 3 illustrates one example embodiment of a computing device upon which an embodiment of a replenishment parameter tool may be implemented. The example computing device may be a computer 300 that includes a processor 302, a memory 304, and input/output ports 310 operably connected by a bus 308.

In one example, the computer 300 may include replenishment parameter tool 330 (corresponding to replenishment parameter tool 110 from FIG. 1) configured with a programmed algorithm as disclosed herein to analyze historical sales data and demand forecast data (when available) for an item, and generate replenishment parameter values that are compatible with an external replenishment system. In different examples, the tool 330 may be implemented in hardware, a non-transitory computer-readable medium with stored instructions, firmware, and/or combinations thereof. While the tool 330 is illustrated as a hardware component attached to the bus 308, it is to be appreciated that in other embodiments, the tool 330 could be implemented in the processor 302, stored in memory 304, or stored in disk 306.

In one embodiment, tool 330 or the computer 300 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate the generation of replenishment parameter values for an item. The means may also be implemented as stored computer executable instructions that are presented to computer 300 as data 316 that are temporarily stored in memory 304 and then executed by processor 302.

Tool 330 may also provide means (e.g., hardware, non-transitory computer-readable medium that stores executable instructions, firmware) for facilitating the generation of replenishment parameter values for an item.

Generally describing an example configuration of the computer 300, the processor 302 may be a variety of various processors including dual microprocessor and other multi-processor architectures. A memory 304 may include volatile memory and/or non-volatile memory. Non-volatile memory may include, for example, ROM, PROM, and so on. Volatile memory may include, for example, RAM, SRAM, DRAM, and so on.

A storage disk 306 may be operably connected to the computer 300 via, for example, an input/output interface (e.g., card, device) 318 and an input/output port 310. The disk 306 may be, for example, a magnetic disk drive, a solid state disk drive, a floppy disk drive, a tape drive, a Zip drive, a flash memory card, a memory stick, and so on. Furthermore, the disk 306 may be a CD-ROM drive, a CD-R drive, a CD-RW drive, a DVD ROM, and so on. The memory 304 can store a process 314 and/or a data 316, for example. The disk 306 and/or the memory 304 can store an operating system that controls and allocates resources of the computer 300.

The computer 300 may interact with input/output devices via the i/o interfaces 318 and the input/output ports 310. Input/output devices may be, for example, a keyboard, a microphone, a pointing and selection device, cameras, video cards, displays, the disk 306, the network devices 320, and so on. The input/output ports 310 may include, for example, serial ports, parallel ports, and USB ports.

The computer 300 can operate in a network environment and thus may be connected to the network devices 320 via the i/o interfaces 318, and/or the i/o ports 310. Through the network devices 320, the computer 300 may interact with a network. Through the network, the computer 300 may be logically connected to remote computers. Networks with which the computer 300 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.

CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

"User", as used herein, includes but is not limited to one or more persons, computers or other devices, or combinations of these.

"Operable interaction", as used herein, refers to the logical or communicative cooperation between two or more logics via an operable connection to accomplish a function.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A method implemented by a computing device configured to execute a computer application, the method comprising:
generating sales statistics for an item based at least in part on historical sales data for the item;
determining if demand forecast data for the item is available to the computing device:
wherein, if the demand forecast data is not available to the computing device, generating an order-point value for the item using a function that is independent of the demand forecast data, the function being based at least in part on the sales statistics, wherein the order-point value represents a threshold inventory level of the item that, when reached or surpassed by an existing inventory level of the item, causes execution of a process for placing an order for additional units of the item, and
wherein if the demand forecast data is available to the computing device:
(i) generating demand forecast statistics for the item based at least in part on the demand forecast data, and
(ii) generating the order-point value using a function of at least the sales statistics and the demand forecast statistics;
generating an order-up-to-level for the item based at least in part on the order-point value, wherein the order-up-to-level represents a level to which the inventory of the item is to be increased as a result of the order; and
controlling a replenishment system by sending the order-point value and the order-up-to-level as replenishment parameters to the replenishment system over a communication network, to cause the replenishment system to execute the order based, at least in part, on the replenishment parameters.

2. The method of claim 1, wherein the generating of the sales statistics includes generating at least one of a mean value and a standard deviation value of numbers of units of the item sold over a plurality of time periods.

3. The method of claim 1, wherein the demand forecast statistics include at least one of a mean value and a standard deviation value of numbers of units of the item forecast to be sold over a plurality of time periods.

4. The method of claim 1, wherein, if the demand forecast data is determined to not be available to the computing device, the generating of the order-point value is based at least in part on the sales statistics, a lead time for the item, an interval of time between orders for the item, and a safety stock factor for the item.

5. The method of claim 1, wherein, if the demand forecast data is determined to not be available to the computing device, the generating of the order-up-to-level is based at least in part on the order-point value, a mean value of the sales statistics, and a remaining time of supply of the item in a current inventory of the item.

6. The method of claim 1, wherein, if the demand forecast data is determined to be available to the computing device, the generating of the order-point value is based at least in part on the sales statistics, the demand forecast statistics, a lead time for the item, an interval of time between orders for the item, and a safety stock factor for the item.

7. The method of claim 1, wherein, if the demand forecast data is determined to be available to the computing device, the generating of the order-up-to-level is based at least in part on the order-point value, a mean value of the demand forecast statistics, and a remaining time of supply of the item in a current inventory of the item.

8. The method of claim 1, wherein if the demand forecast data for the item is determined to not be available to the computing device, the order-point value is represented as a min-value, and the order-up-to-level is represented as a max-value.

9. The method of claim 1, wherein if the demand forecast data for the item is determined to be available to the computing device, the method further comprising generating a min-supply value, a max-supply value, and a time-supply-horizon value based at least in part on the order-point value and the order-up-to-level.

10. The method of claim 9, further comprising sending the min-supply value, the max-supply value, and the time-supply-horizon value to the replenishment system.

11. A computing system, comprising:
a statistics module, including instructions stored in a non-transitory computer-readable medium, configured to:
(i) generate sales statistics for an item based at least in part on historical sales data for the item, and
(ii) generate demand forecast statistics for the item based at least in part on demand forecast data for the item;
an order parameter module, including instructions stored in a non-transitory computer-readable medium, configured to:
(i) generate an order-point value, based at least in part on the sales statistics using a function that is independent of the demand forecast data for the item when the demand forecast data for the item is not available to the computing system, wherein the order-point value represents a threshold inventory level of the item that, when reached or surpassed by an existing inventory level of the item, causes execution of a process for placing an order for additional units of the item,
(ii) generate the order-point value using a function of at least the sales statistics and the demand forecast statistics when the demand forecast data for the item is available to the computing system, and
(iii) generate an order-up-to-level for the item, based at least in part on the order-point value, wherein the order-up-to-level represents a level to which the inventory of the item is to be increased as a result of the order; and
a replenishment transformation module, including instructions stored in a non-transitory computer-readable medium, configured to control a replenishment system by sending the order-point value and the order-up-to-level as replenishment parameters to the replenishment system over a communication network, to cause the replenishment system to execute the order based, at least in part, on the replenishment parameters.

12. The computing system of claim 11, wherein the replenishment transformation module is further configured to:
when demand forecast data for the item is not available to the computing system,
transform the order-point value into a min-value, wherein the min-value is compatible with a min/max replenishment system;
transform the order-up-to-level into a max-value, wherein the max-value is compatible with the min/max replenishment system; and
send the max-value and the min-value to the min/max replenishment system.

13. The computing system of claim 11, wherein the replenishment transformation module is further configured to:
when demand forecast data for the item is available to the computing system,
generate a min-supply value, a max-supply value, and a time-supply-horizon value based at least in part on the order-point value and the order-up-to-level, wherein the min-supply value, the max-supply value, and the time-supply-horizon value are compatible with a time-supply replenishment system; and
send the min-supply value, the max-supply value, and the time-supply-horizon value to the time-supply replenishment system.

14. The computing system of claim 11, further comprising a visual user interface module, including instructions stored in a non-transitory computer-readable medium, configured to:
determine if demand forecast data for the item is available to the computing system; and
facilitate inputting of the historical sales data for the item and the demand forecast data for the item into the statistics module.

15. The computing system of claim 11, further comprising:
a visual user interface module, including instructions stored in a non-transitory computer-readable medium, providing a graphical user interface; and
a display screen configured to display and facilitate user interaction with at least the graphical user interface.

16. The computing system of claim 11, further comprising a database device configured to store at least one of the historical sales data and the demand forecast data.

17. A non-transitory computer-readable medium storing computer-executable instructions that, when executed by a processor provided to a computer system, cause the computer system to:
generate sales statistics for an item based at least in part on historical sales data for the item;
generate demand forecast statistics for the item based at least in part on demand forecast data for the item;
when the demand forecast data for the item is not available to the computing system, generate an order-point value for the item based at least in part on the sales statistics using a function that is independent of the demand forecast data for the item, wherein the order-point value represents a threshold inventory level of the item that, when reached or surpassed by an existing inventory level of the item, causes execution of a process for placing an order for additional units of the item;
when the demand forecast data for the item is available to the computing system, generate the order-point value for the item based on at least the sales statistics and the demand forecast statistics;
generating an order-up-to-level for the item based at least in part on the order-point value, wherein the order-up-to-level represents a level to which the inventory of the item is to be increased as a result of the order; and
control a replenishment system by sending the order-point value and the order-up-to-level as replenishment parameters to the replenishment system over a communication network, to cause the replenishment system to execute the order based, at least in part, on the replenishment parameters.

18. The non-transitory computer-readable medium of claim 17, wherein the instructions configured for generating the order-point value include instructions configured for generating the order-point value based at least in part on the sales statistics, the demand forecast statistics, a lead time for the item, an interval of time between orders for the item, and a safety stock factor for the item.

19. The non-transitory computer-readable medium of claim 17, wherein the instructions configured for generating the order-up-to-level include instructions configured for generating the order-up-to-level based at least in part on the order-point value, a mean value of the demand forecast statistics, and a remaining time of supply of the item in a current inventory of the item.

20. The non-transitory computer-readable medium of claim 17, wherein the instructions configured for generating the sales statistics include instructions configured for generating at least one of a mean value and a standard deviation value of numbers of units of the item sold over a plurality of time periods.

21. The non-transitory computer-readable medium of claim 17, wherein the instructions configured for generating the demand forecast statistics include instructions configured for generating at least one of a mean value and a standard deviation value of numbers of units of the item forecast to be sold over a plurality of time periods.

* * * * *

UNITED STATES PATENT AND TRADEMARK OFFICE
CERTIFICATE OF CORRECTION

PATENT NO. : 9,990,597 B2  
APPLICATION NO. : 14/671233  
DATED : June 5, 2018  
INVENTOR(S) : He et al.

Page 1 of 1

It is certified that error appears in the above-identified patent and that said Letters Patent is hereby corrected as shown below:

On page 2, Column 2, under U.S. Patent Documents, Line 7, delete "G06O" and insert -- G06Q --, therefor.

Signed and Sealed this  
Twenty-ninth Day of January, 2019

Andrei Iancu  
*Director of the United States Patent and Trademark Office*